(12) United States Patent
Pirhonen

(10) Patent No.: US 6,269,397 B1
(45) Date of Patent: Jul. 31, 2001

(54) SYSTEM AND METHOD FOR NETWORK ELEMENT MANAGEMENT IN A TELECOMMUNICATIONS NETWORK

(75) Inventor: Jouni Pirhonen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/420,074

(22) Filed: Oct. 18, 1999

Related U.S. Application Data

(63) Continuation of application No. PCT/FI98/00384, filed on May 5, 1998.

(30) Foreign Application Priority Data

May 5, 1997 (FI) ........................................................ 971919

(51) Int. Cl.[7] ................................................ G06F 15/16
(52) U.S. Cl. ............................................ 709/223; 709/201
(58) Field of Search ................................... 709/223, 230, 709/201; 707/10, 103; 379/207, 230

(56) References Cited

U.S. PATENT DOCUMENTS

| 5,285,494 | 2/1994 | Sprecher et al. | 455/423 |
| 5,794,039 | * 8/1998 | Guck | 707/103 |
| 5,848,415 | * 12/1998 | Guck | 707/10 |
| 6,070,188 | * 5/2000 | Grant et al. | 709/223 |
| 6,112,246 | * 8/2000 | Horbal et al. | 709/230 |

FOREIGN PATENT DOCUMENTS

| 686 540 | 4/1996 | (CH). |
| 0 753 821 | 1/1997 | (EP). |
| 95/34975 | 12/1995 | (WO). |
| 96/15635 | 5/1996 | (WO). |
| 97/23988 | 7/1997 | (WO). |
| 97/50210 | 12/1997 | (WO). |
| 98/21668 | 5/1998 | (WO). |
| 98/33302 | 7/1998 | (WO). |

OTHER PUBLICATIONS

International Search Report for PCT/FI98/00384.
"Network Management/Analysis" Larsen, Data Communications, Jan. 1997, pp. 116–128.
"The Next Web Wave: Network Management" Larsen, Data Communications, Jan. 1996, pp. 31–34.

* cited by examiner

Primary Examiner—Zarni Maung
Assistant Examiner—Jung Won Chang
(74) Attorney, Agent, or Firm—Altera Law Group, LLC

(57) ABSTRACT

The invention relates to a method for network element management in a telecommunications network. The network elements are coupled on a management bus (MB) used by the telecommunications network. In accordance with the method, management messages are sent from a management workstation via the management bus to the network elements (NE) to be managed. In order to facilitate the management of network elements having various management interfaces, a management server (S1) in the Internet or in an Intranet is used for the management, the server being connected via the management bus (MB) to the network elements to be managed, the management alternatives relating to the managed network element are sent through the Internet or Intranet to the user's management workstation in the form of SGML-based documents, and the management operations carried out by the user in the documents are converted in the management server into messages to be sent onto the management bus, by means of which messages the network elements are managed.

3 Claims, 2 Drawing Sheets

SYSTEM AND METHOD FOR NETWORK ELEMENT MANAGEMENT IN A TELECOMMUNICATIONS NETWORK

This is a continuation of PCT/FI98/00384 filed May 5, 1998.

FIELD OF THE INVENTION

The invention generally relates to network element management in a telecommunications network, particularly to the management of known Q1-managed network elements.

BACKGROUND OF THE INVENTION

The management systems of telecommunications networks in accordance with the newest standards, such as SDH (Synchronous Digital Hierarchy) networks, have been defined in international standards, in order that network elements by different manufacturers, located in the same network, may be easily managed through the same network management workstations, or network management products by different manufacturers may be used to manage any network. Generic models for different types of equipment are stored in the management system, and thus equipment by different manufacturers can be managed from the same system if said equipment is in accordance with the generic model.

On the other hand, the management of network elements representing older-generation systems (also new equipment) is more problematic, since there are far more manufacturer-related and equipment-specific variations in the management interfaces. For this reason, specific commercial management products are not available either.

FIG. 1 illustrates the principle on which for example the Applicant's PDH (Plesiochronous Digital Hierarchy) equipment is presently managed. A workstation WS1 of the network management system or a service man's portable workstation WS2 includes software with e.g. a graphical user interface having a Q1 interface and an electrical connection in accordance with ITU-T recommendation V.11 through which data can be transferred asynchronously at rates 75 . . . 19200 bit/s.

Q1 is a master-slave management protocol that is used for the management of the Applicant's PDH network elements. The network elements NE to be managed are coupled on a common management bus MB. The management workstation (WS1 or WS2) is connected either directly to the local management interface of the managed network element or to a desired network element through the management interface of another network element and a management bus of the telecommunications network. The management workstation serves as a master that sends commands to the network element. The network element (slave) does not send anything on its own accord, but only responds to queries sent by the management workstation. The exchange of information between the management workstation and the network element takes place asynchronously in 11-bit frames. Longer messages are divided into several successive frames. A message to be sent may comprise 1 . . . 26 frames. Each message sent by the master element starts with an address frame containing the address of the network element for which the message is intended. Each message sent by the network element again starts with an address frame containing the address of that network element.

As will yet be stated hereinbelow, the management protocol used by the network elements may vary. Nevertheless, the Q1 protocol employed for managing conventional PDH equipment will be used as an example in the following.

In the Q1 protocol, network element management is based on character-based menus. The network elements have a generic main menu for the management thereof; the menu is the same for all Q1-managed equipment. When one alternative is selected from the main menu, the managed network element sends as a response to the management workstation a data structure determining the menu structure that said network element uses under said alternative. FIG. 2 illustrates such a procedure. All network elements may for example have a main menu M1 as shown in the figure, and when it is desired e.g. to look up statistics for a given network element, said network element can return to the management workstation a submenu M2 as shown in the figure, for instance, wherefrom the user can further select the desired alternative. Hence, navigation in the menu tree of the network element takes place in such a way that the user selects from the menu the desired item, information on the selection is forwarded to the network element, which returns in response a new menu wherefrom the user can again select the desired alternative, etc.

Depending for example on the type of the network elements or the version of a given type, there may be differences in the menus used by the network elements. Thus, the management software must be altered according to the manufacturer, type and version of the network element. The menu to be used also varies according to the language used by the network element. The problem with the known management procedure is therefore that it is difficult to maintain the management software at the management workstations, as changes to the management software must be made at numerous management workstations depending on what the managed network element is like.

SUMMARY OF THE INVENTION

It is an object of the invention to eliminate the above-described drawback and to provide, in a hardware environment of the kind described above, a method by means of which the management can be implemented far more simply than heretofore.

This object is achieved with the solution defined in the independent claims.

The idea of the invention is to manage network elements of the above kind through a server in the Internet or in an Intranet, said server being coupled in addition to said network also on a management bus and preferably having stored therein the common menu structure of the network elements. In this way, all the special features that were previously needed at the different management workstations can be transferred to the server which is common to a large number of network elements and management workstations.

On account of the solution in accordance with the invention, any known browser can be used at the management workstation for managing the network elements. Thus, there is no need for the service man's computer to include any equipment-specific or manufacturer-related software or software upgrades, but the service man can easily manage any network element using merely a commercial browser.

BRIEF DESCRIPTION OF THE DRAWINGS

The invention and its preferred embodiments will be described in detail in the following with reference to FIGS. 3 and 4 in the examples in accordance with the accompanying drawings, in which.

DETAILED DESCRIPTION OF THE INVENTION

Figure 1:
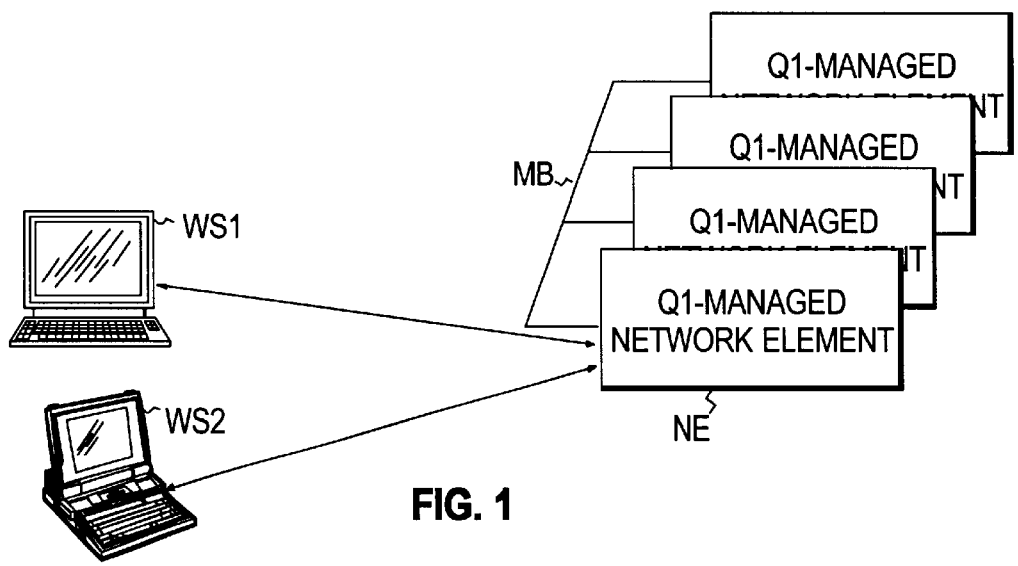
FIG. 1 illustrates the management of present-day Q1 network elements.
Figure 2:
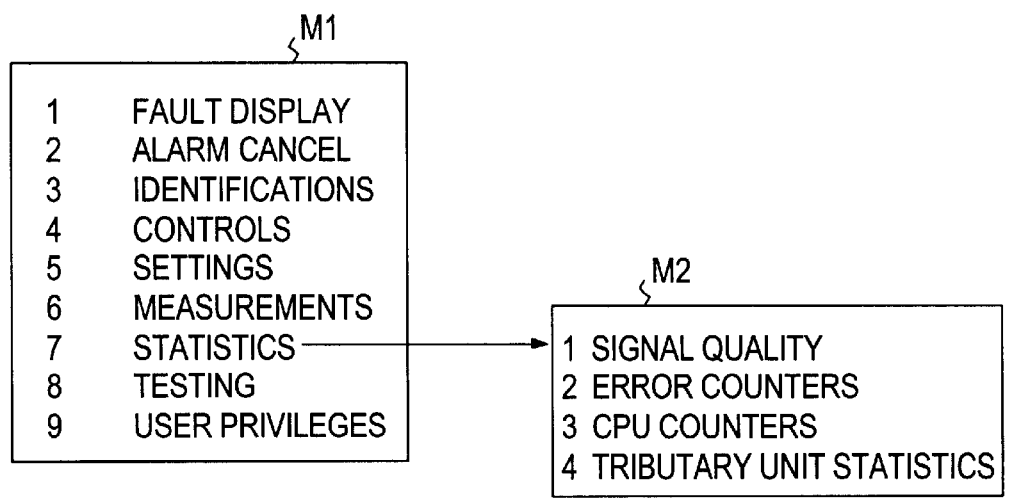
FIG. 2 shows an example of menus used by Q1-managed network elements.
Figure 3:
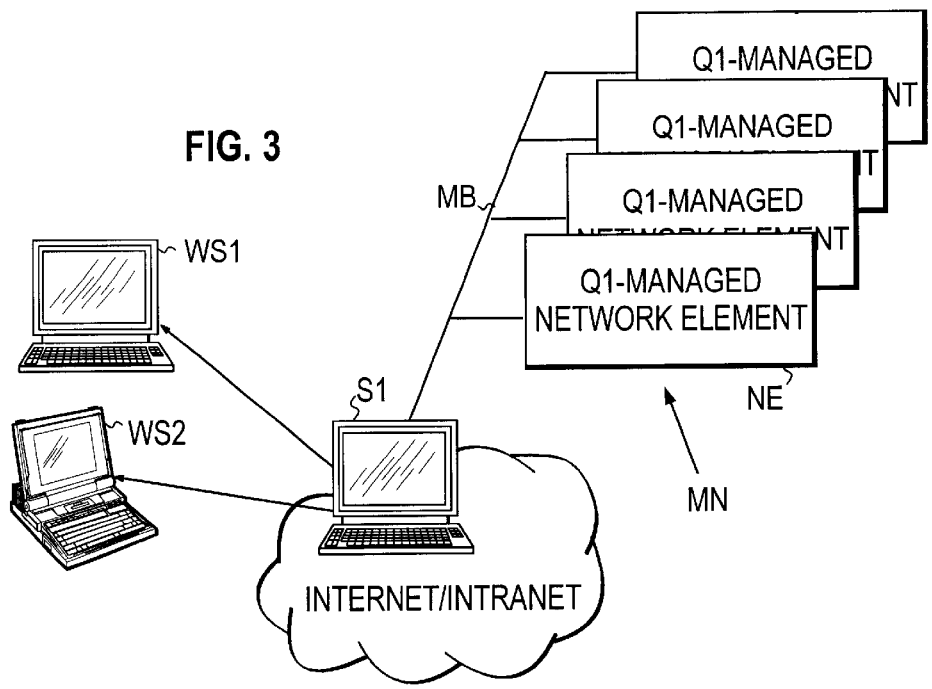
FIG. 3 illustrates management of Q1 network elements in accordance with the invention.

The management system in accordance with the invention in the exemplary case of FIG. 3 includes a management server S1 serving as a node of the Internet or an Intranet network (or an equivalent TCP/IP network), said server being connected to the network elements NE to be managed though a management bus MB used by the managed network. It should further be noted that the management bus is typically made up by one or more EOC management channels (Embedded Operation Channel) embedded in the useful signal. If for instance the signals between the network elements NE of the telecommunications network are 2048 kbit/s signals in accordance with ITU-T recommendations G.703/G.704 in which a frame comprises 32 time slots (TS0 ... TS31) and a multiframe 16 frames, the management information can be transferred in the signal frame structure for instance in such a way that the management channel reserves three bits from time slot TS0 in the frame structure. In every other frame, time slot TS0 has a frame alignment mark, but in every other frame bits 4–8 are free for national use, and thus they can be used for conveying network management information. Through the management bus the network elements communicate with the management server using the Q1 protocol.

The management server can also be coupled directly to the management bus in such a way that the entire management information is conveyed in a dedicated cable. In the case of the Q1 protocol, the interface between the server and the bus may be for example a V.11 or a RS 232. It is also possible that the management server is connected through another network to the management bus in such a way that the management server is still connected to the network elements through the management protocol. Such a situation might arise for instance if the management server is connected through a LAN to the network management system and therethrough to the network elements. The management server can also be integrated as part of the overall management system.

The telecommunications network to be managed is denoted with reference MN in the figure. The management thus logically involves two networks: a telecommunications network in which the network elements to be managed are, and a (TCP/IP) network (Internet/Intranet) through which the management workstation is in contact with the server. The management server is in contact with the network elements through the management protocol (e.g. Q1) used by the network elements.

The management server S1 stores HTML files pertaining to the management of the network elements NE and the main menu common to all network elements on the management bus. (HTML, i.e. HyperText Markup Language, is the document description language that is used on the Internet WWW network.)

Management workstation WS1 or WS2 has a conventional commercial browser (e.g. Netscape Navigator or Microsoft Explorer) by means of which the service man contacts the management server S1 in order to read HTML documents pertaining to the management. The management server also has first conversion means converting the selections given on HTML pages in the browser into messages in accordance with the management protocol used (e.g. Q1 messages) and forward them via the management bus to the network elements, and second conversion means converting the responses given by the network elements into HTML pages that are sent in a known manner to the management workstation.

The operation of the management system in accordance with the invention can be for example as follows.

The user (e.g. a service man) contacts the management server through the browser on his management workstation and reads HTML pages stored in the server. On the first HTML page, for example an illustration of the network with network elements or a list of network elements NE to be managed can be presented to the management workstation. The user selects the desired network element either by clicking at the relevant node of the network or by selecting the network element from the list. Furthermore, a main menu common to all network elements can be presented on the first page. The user selects the desired alternative from this menu.

Alternatively, the HTML page may present a dialog box in which the user may directly enter the address of the desired network element and possibly also a Q1 command. The first alternative is preferable, however, since it does not require one to know the addresses of the network elements, let alone mastering the Q1 command structure.

When the user has selected the network element and the desired item in the main menu (for example statistical data), the management server sends to the network element a query requesting the menu list used by the network element, which is under the desired item. The network element responds to this by sending information on the next menu to the server which converts the information into a HTML page that is presented through the network to the management workstation. In this way the menu tree is run through until the final desired alternative, e.g. an operation that the user selects, is encountered in the menu. When the desired operation has been executed, the Q1 connection is first terminated and thereafter the WWW connection.

Figure 4:
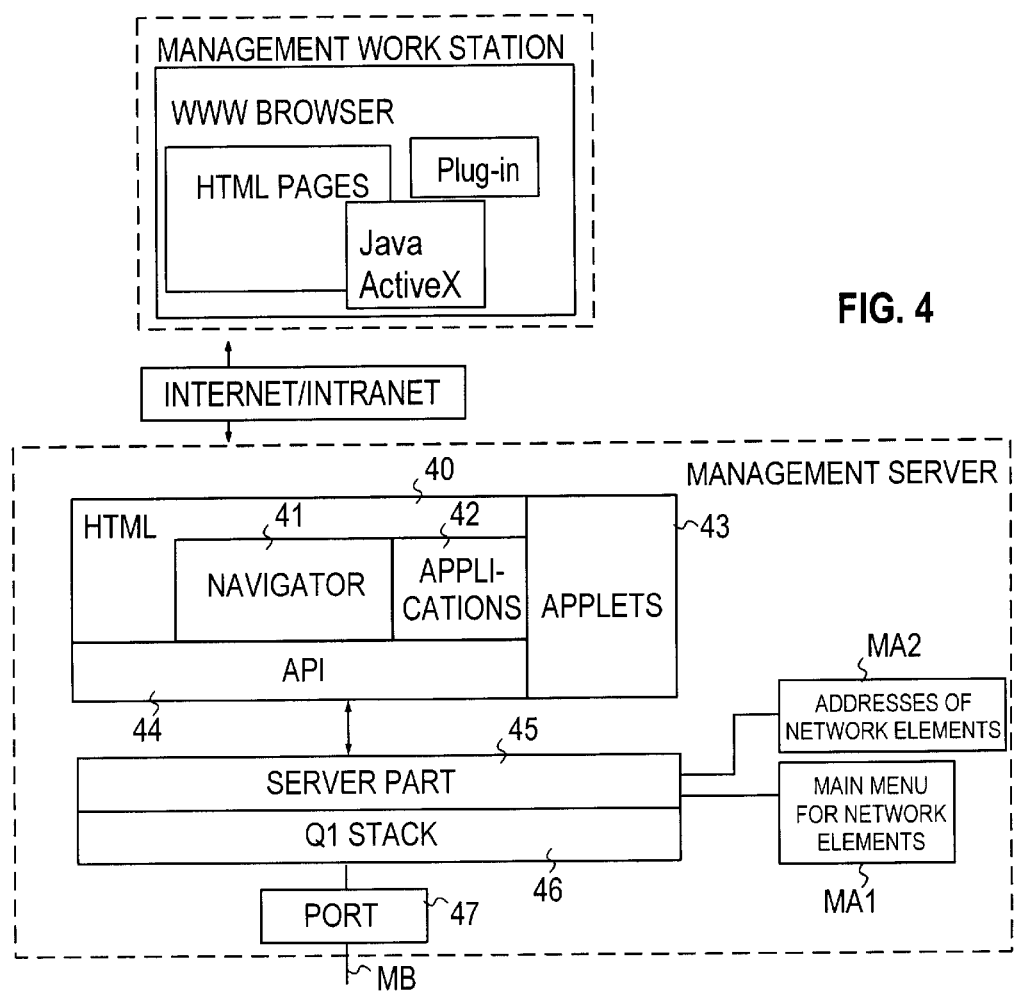
FIG. 4 illustrates the architecture of the server and the workstation.

FIG. 4 illustrates the system architecture by depicting the functional elements of the management server and management workstation.

The management server S1 firstly has an HTML part 40 comprising all the functionality that relates to HTML documents. This part thus comprises descriptions of the documents used. The HTML part includes a navigator part 41 that transfers the information given on the HTML pages to the lower layers and dynamically converts the responses given by the network elements into HTML documents. The navigator part presents the branches of the menu tree and the elements to be configured in such a way that the user can navigate in the menu tree and change the settings of the network element. The navigator part communicates through an Application Programming Interface (API) 44 with a server part 45. The HTML part may also include a functionally independent application part 42 by means of which an application can be started within a page, e.g. graphics (for example an illustration of the network to be managed) or simple animations, such as red blinking alarm lights in an equipment rack, can be produced within the HTML pages.

The operation of the HTML part may also be extended with an applet part 43, for example, by means of which operations can be directly executed that are invisible to the user. For example, a cross-connect applet can perform the desired cross-connection. The applets are transferred directly to the user's workstation when he opens a page to which applets are attached. Microsoft's ActiveX technology, for example, can be used as an alternative to applets or along with them.

The server part 45 handles to all communication with the managed network elements and forwards the responses given by the network elements to the upper layers. The server part is connected through a Q1 protocol stack 46 (and port 47) to the management bus MB. The server part may request addresses from all network elements on the management bus and store them in the memory of the server (storage area MA2). This is performed in such a way that the server first sends a query furnished with address one to the management bus and awaits whether there is a response to the query, thereafter a query furnished with address two, etc. The server part also retrieves from memory (storage area MA1) the common main menu of the network elements. The Q1 stack receives the information bytes to be sent to the network elements from the server part and forms therefrom frames in accordance with the Q1 protocol. In the reverse transmission direction, the Q1 stack disassembles the frames and transfers the information bytes contained therein to the server part.

The server part and the Q1 stack operate in the second layer of the OSI model (transmission link layer), whereas the operations of the HTML part are operations of the application layer.

In view of practical programming technique, there are two basic alternatives for implementing a system of the kind described above. In accordance with the first alternative, CGI (Common Gateway Interface) programs can be used. CGI is an interface used by web servers, through which programs on a server can be run. A CGI program is a program run on a server, started by a browser by sending a URL (Uniform Resource Locator) pointing to the CGI program. CGI programs dynamically create HTML documents or for example transfer data inserted in a document to another application. The advantage of a CGI implementation is, among other things, easy transferability between different operating systems. On the other hand, a disadvantage is that several programs executed simultaneously may excessively load the server.

Another alternative is to use a Dynamic Link Library DLL, in which case the library functions are called directly from the HTML pages. The advantage of a DLL implementation is its rapidity, as additional processes loading the CPU are not created therein. The architecture shown in FIG. 4 mainly corresponds to the DLL implementation, as it has a unitary server part (which in a CGI implementation would consist of several different program modules).

In the extension of the operations of HTML pages, mere CGI may also be used (for example instead of Java applets and/or ActiveX controls).

Even though the Internet or an Intranet and the HTML description language employed therein have been used as an example above, it is evident that the same principle can be used in any system in which the browser can read documents on a server through the network and send amendments in the contents of the document back to the server. Hence, it is evident that the system may make use of any browser constructed on the principles of SGML. (SGML, i.e. Standard Generalized Markup Language, is an information structuring and management standard defined in the international ISO standard 8879:1986, and HTML is an example of a structural language realized on the SGML rules.)

In accordance with the solution described above, a common server was used for the network elements. It is also possible in principle that each managed network element includes a server and the network element communicates directly with the management workstation by means of the HTTP protocol (HTTP, i.e. HyperText Transfer Protocol, is a protocol wherewith web documents are transferred in the Internet). In practice, this means that the file system of the network element has SGML-based document descriptions. Since, however, existing network elements cannot be managed in accordance with such a management principle, it is preferable to use the above-described management principle which utilizes a management server common to the network elements. As for new network elements, the menus used by them can be modelled onto the server, and thus the management server need not request management alternatives from the network element.

Even though the invention has been described in the above with reference to the examples in accordance with the accompanying drawings, it is evident that the invention is not restricted to it, but it can be modified within the scope of the inventive idea set forth in the appended claims. Even though reference has been made in the above to Q1-managed network elements, it is evident that the idea can be made use of in conjunction with any management protocol of a similar type (e.g. MML, Man Machine Language, which is a known management interface utilizing text-based menus) by using the server as a document producer on the one hand and as a master element managing the network elements by means of said management protocol on the other hand. As stated previously, the system may also be implemented in a simple form in such a way that the server does not have the addresses of the network elements or a main menu, but the user must know the addresses. The implementation of the connection between the servers and the workstations may also vary in many ways when new web tools are introduced.

What is claimed is:

1. A management system for network element management in a telecommunications network, the system comprising at least one management workstation (WS1, WS2) for sending management information to the network elements to be managed, a management bus (MB) in the telecommunications network, on which bus the network elements (NE) to be managed are coupled and through which the management information sent by the management workstation is transferred to the network elements, a management server (S1) in the Internet or in an Intranet, first conversion means (41, 45, 46) in connection with the management server for converting the management information given from the management workstation that is in contact with the management server into management messages, and second conversion means (41, 45, 46) in connection with the management server for converting the response messages given by the network element into documents in accordance with the description language understood by the program used by the management workstation, the documents being sent in a known manner to the management workstation, wherein said telecommunications network is a non-TCP network, wherein said management server is connected to the management bus (MB) of said telecommunications network for converting the management information into messages conforming to a management protocol used in said telecommunications network and for sending said messages to the management bus, and a main menu of management alternatives relating to the network elements to be managed is stored in advance in the management server, and the management server is adapted to request other management alternatives from the network element and to form from the received response a SGML-based document to be sent to the management workstation.

2. A management system as claimed in claim 1 wherein, the documents are presented in the form of HTML pages.

3. A management system as claimed in claim 1 wherein, the addresses of all network elements on the management bus are stored in the management server.

* * * * *